Jan. 23, 1968 R. KREMP ET AL 3,364,831
STRUCTURE FOR ADJUSTING CAMERAS ACCORDING TO THE
SPEED OF THE FILM CONTAINED THEREIN
Filed Sept. 28, 1964 2 Sheets-Sheet 1

INVENTOR.
RUDOLF KREMP
WILLY KISSELMANN
ALFRED WINKLER
FRITZ RÜMPELEIN

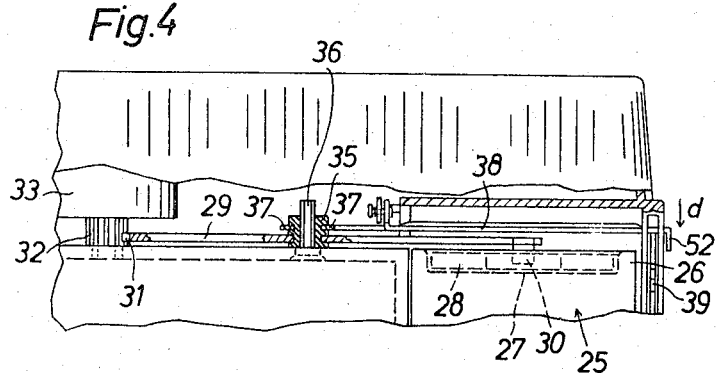
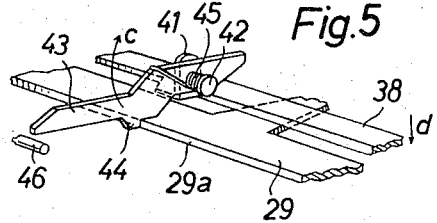
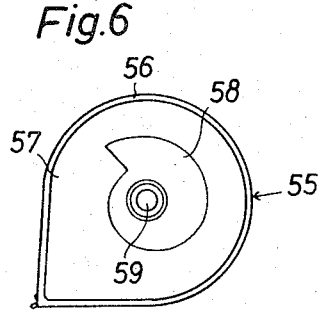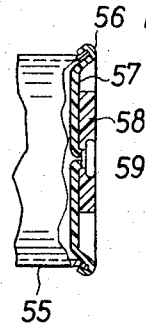
INVENTOR.
RUDOLF KREMP
WILLY KISSELMANN
ALFRED WINKLER
FRITZ RÜMPELEIN "# United States Patent Office 3,364,831
Patented Jan. 23, 1968

3,364,831
STRUCTURE FOR ADJUSTING CAMERAS AC-
CORDING TO THE SPEED OF THE FILM
CONTAINED THEREIN
Rudolf Kremp and Willy Kisselmann, Grunwald, and
Alfred Winkler and Fritz Rümpelein, Munich, Ger-
many, assignors to Agfa Aktiengesellschaft, Leverkusen,
Germany
Filed Sept. 28, 1964, Ser. No. 399,646
Claims priority, application Germany, Sept. 30, 1963,
A 44,171
7 Claims. (Cl. 95—31)

ABSTRACT OF THE DISCLOSURE

A cartridge for convoluted roll film has an end wall which carries a separately produced film speed indicator. The latter is externally affixed to the end wall in a position which is indicative of the film speed so that the indicator may effect automatic adjustment of the exposure meter when the cartridge is inserted into the camera.

The present invention relates to cameras.

More particularly, the present invention relates to cameras which have structures for adjusting the camera according to the speed of the film exposed therein. Such structures are of particular significance in cameras which are capable of being automatically set according to the lighting conditions for determining the extent to which film in the camera is exposed.

Of course, structures are already known for adjusting cameras of this type according to the film speed. For example, the structure for automatically setting the camera very frequently includes a galvanometer the moving coil of which assumes an angular position determined by the lighting conditions, and in order to adjust the camera for the film speed such a galvanometer is mounted in its entirety for angular adjustment about its axis so that by initially setting the angular position of such a galvanometer the factor of the speed of the film which is exposed can be introduced into the camera. However, this factor can also be introduced in other ways. For example, the window through which light reaches the photosensitive element to influence the galvanometer can be provided with an adjustable cover which can be adjusted to cover this window to an extent determined by the film speed, so that in this way also the camera can be adjusted in accordance with the speed of the film to be exposed therein. In addition, it is possible simply to include in the electrical circuit of the light measuring and camera adjusting structure a variable resistor whose resistance can be varied in accordance with the film speed, so that in this way also it is possible to equip a camera with a structure for adjusting the camera according to the speed of the film which is exposed therein.

While structures of this latter type are in general well known, they of course require the operator to make the adjustment, and this is an inconvenience and in fact a likely source of error because the operator, particularly if the operator is an amateur, can easily forget to introduce into the camera the factor of the speed of the film which is exposed therein, and therefore improper film exposures will result.

It is therefore known to provide for cameras of the above type film containers, in the form of suitable film cartridges, for example, which carry at their exteriors structures indicative of the speed of the film which is housed within the film container, and when the latter is introduced into the camera the structure projecting from the exterior of the film container and indicative of the film speed will actuate camera structure for automatically setting this camera structure to introduce into the camera the factor of this speed of the film to be exposed therein.

In this way it has become possible to avoid the above-mentioned drawback of the forgetfullness of the camera operator which might result in improper exposure by a failure to set the camera according to the film speed which is exposed therein. However, there is a serious drawback in this solution to the problem. This drawback is that the film containers, such as suitable film cartridges, must be initially constructed in such a way as to carry the indication of the film speed, and therefore the manufacturer must be very careful to introduce into the film containers, whether they be magazines, cartidges, or any other type of film container, a film which has a speed which corresponds to that part of the film container structure which indicates the film speed. Of course, this gives rise to an additional source of error since it is quite possible for the manufacturer to introduce into the film container a film whose speed does not correspond to that indicated by the structure of the container itself, but of even greater significance is the very serious drawback that it is necessary for the manufacturer or other supplier of film to keep on hand very large supplies of many different film containers because the containers for the different films of the various film speeds will have to be different. This necessity of maintaining on hand a large stock of film containers so that the containers for the various film speeds will be on hand, is an extremely serious problem in the art.

It is accordingly a primary object of the present invention to avoid the above drawbacks by making it possible to store only one container structure irrespective of the speed of the film which is introduced into the latter.

Another object of the present invention is to provide for film containers of the above type a structure capable of being fixedly attached to the exterior of the container after the speed of the film to be introduced therein has been determined, so that in this way all of the containers can have the very same construction irrespective of the film introduced therein, since the structure which will be indicative of the film speed can be fixedly attached to the container once the speed of the film is known.

Furthermore, it is an object of the invention to provide a structure of the above type which can very easily and conveniently actuate camera structure for introducing automatically into the camera the factor of the speed of the film to be exposed therein.

In addition, it is an object of the present invention to provide a structure of the above type where the film speed indicating means will be protected on the film container so that a false indication cannot be given if the film container is accidentally dropped or pushed against some foreign object, for example.

Also, the objects of the present invention include the provision of a camera of the above type where the film container can be introduced into or removed from the camera without any difficulty while at the same time the structure for adjusting the camera according to the film speed will be automatically rendered operative when the camera is closed in preparation for making an exposure and will be rendered inoperative when the camera is opened in preparation for removing from the camera a cartridge containing exposed film.

With the above objects in view, the invention includes, in a camera which has a structure for adjusting the camera according to the film speed, a film cartridge which has a depressed end wall and which has a rim projecting beyond the depressed end wall to define with the latter an end recess of the film cartridge. A film speed indicating means is fixed to the cartridge in the end recess thereof, and this film speed indicating means can be fixed to the cartridge once the speed of the film to be produced therein is known, so that in this way the cartridge can have the same construction irrespective of this film speed, and the film speed indicating means can be fixedly attached to the cartridge after the latter has been manufactured and filled with film of a given speed. A feeler means is carried by the camera and engages the film speed indicating means after the cartridge has been introduced into the camera, so as to sense the speed of the film which is in the cartridge, and this feeler means is operatively connected to the adjusting means to actuate the latter to adjust the camera automatically in accordance with the speed of the film which is in the cartridge.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a fragmentary partly sectional elevation of the structure of FIG. 3;

FIG. 5 is a fragmentary perspective illustration of the manner in which levers of FIGS. 3 and 4 cooperate with each other;

FIG. 6 is a top plan view of a cartridge having a different construction than those of FIGS. 1–5; and FIG. 7 is a transverse sectional view of that end of the cartridge of FIG. 6 which is visible in FIG. 6.

Figure 1:
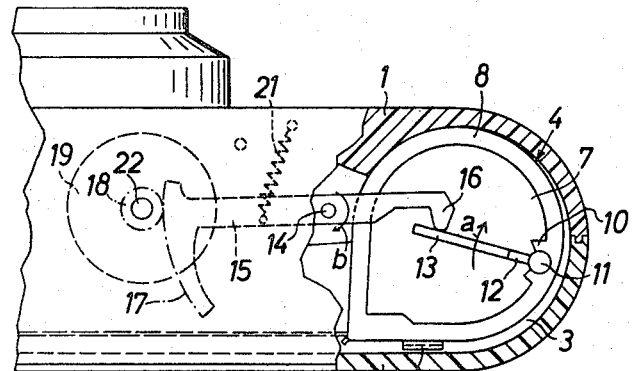
FIG. 1 is a fragmentary partly sectional top plan view of a camera provided with the structure of the present invention.

In FIG. 1 there is fragmentarily illustrated, in a schematic manner, a camera housing 1 which is provided with a rear cover 2 capable of being displaced in a well known manner to and from the closed position thereof shown in FIG. 1. The housing 1 together with the cover 2 define a chamber 3 for receiving a film cartridge 4. The film container or cartridge 4 is maintained in the position illustrated in FIG. 1 by a leaf spring 5 which is fixedly carried by the cover 2, so that when the latter is moved to its position closing the housing 1, the cartridge 4 will be maintained in the illustrated position within the cartridge chamber 3.

Figure 2:
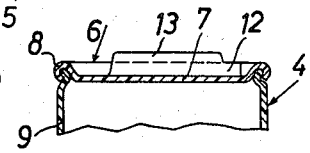
FIG. 2 is a fragmentary sectional elevation of a film cartridge according to the invention, FIG. 2 showing the structure at one end of the cartridge.

As is apparent from FIG. 2, the film cartridge 4 includes an elongated tubular side wall 9 which is closed by an end assembly 6 in the form of a closure cap having a depressed end wall 7 surrounded by a rim 8 which projects beyond the depressed end wall 7 to define with the latter an end recess at the exterior or the film cartridge 4. In the illustrated example the cartridge 4 is made out of metal and the rim 8 which projects beyond the depressed end wall 7 of the closure cap 6 is spun onto the free end edge portion of the tubular side wall 9 so as to close the end of the latter and so as to fix the closure cap 6 to the tubular cartridge member 9. Where the cartridge 4 is made of plastic, the components 6 and 9 thereof may be integral with each other while still forming a rim 8 projecting beyond the depressed end wall 7. In this way the cartridge 4 will have at the end thereof illustrated in FIGS. 1 and 2 an end recess at the exterior of the cartridge.

As is shown most clearly in FIG. 1, part of the rim 8, at its face which is directed toward the interior of the end recess, is formed with an aperture so as to provide a bearing 10 which receives the rounded end portion 11 of an elongated bar member 12 which forms a film speed indicating means. The end 11 of the bar member 12 is turnable in the bearing portion 10 of the rim 8, so that the elongated bar member 12 can be turned either in the direction of the arrow a, shown in FIG. 1, or in the opposite direction. In this way it is possible to situate the bar member 12 at a position with respect to the remainder of the cartridge which is indicative of the speed of the film in the cartridge. Once the bar member 12 has been placed in a position which is indicative of the film speed, this bar member 12 can be fixed in this latter position either by being adhesively connected to the depressed end wall 7 with a suitable glue, cement, or the like, or the bearing 10 can be compressed with a suitable tool against the portion 11 so as to prevent the latter from turning further in the bearing 10, and in this way also the bar member 12 can have its film-speed indicating position fixed. Thus, the structure of the invention provides a means for fixedly attaching to the cartridge at the exterior thereof a film-speed indicating means. In this way it becomes possible to completely finish the cartridge 4 and to give it a construction which will be the same irrespective of the speed of the film which is introduced into the cartridge 4. It only becomes necessary to adjust the position of the bar member 12 after the film has been introduced into the cartridge 4, so that while it is possible to provide a single structure of a film cartridge 4 for all types of film, nevertheless once the type of film in the cartridge 4 is known, it is possible to adjust the position of the bar member 12 so that in this way the film-speed indicating means 12 will give a proper indication of the speed of the film in the cartridge 4.

In the embodiments of FIGS. 1 and 2, the bar member 12 has an outer edge portion 13 distant from the wall 7 and projecting beyond the rim 8, and it is this outer portion 13 which is sensed by a feeler means which in turn actuates structure of the camera to automatically set the latter in accordance with the film speed.

A particularly simple feeler means and adjusting means, for adjusting the camera according to the film speed, is provided with the structure illustrated in FIG. 1, according to which a simple, two-armed lever 15 is supported for rotary movement about a stationary pin 14, the right end portion of the lever, as viewed in FIG. 1, extending into the chamber 3 over the cartridge 4 therein closely adjacent to the upper end of the cartridge 4. This end of the lever 15, which is adjacent the cartridge 4, has a feeler portion 16 which is adapted to be engaged by the exterior edge portion 13 of the bar member 12. The other end of the lever 15 fixedly carries a gear sector 17 meshing with a pinion 18 which is fixed to the galvanometer housing 19 which is supported for turning movement by a stationary pin 22, so that in response to turning of the lever 15 by engagement of feeler means 16 with the edge portion 13 of the film-speed indicating means 12, the gear sector 17 will rotate the pinion 18 so as to adjust the angular position of the galvanometer housing 19, and thus it is clear that the angular position thereof will be determined by the angular position of the film speed indicating means 12. A spring 21 is operatively connected with the lever 15 for urging the latter to turn in the direction of the arrow b shown in FIG. 1, and in this way the feeler means 16 is maintained in the path of movement of the indicating means 12 when the cartridge 4 is introduced into the housing, and the location of the cartridge 4 in the housing will result in turning of the lever 15, because of the displacement of the feeler means 16, the latter being displaced from a rest position situated nearer to the rear of the camera than shown in FIG. 1 forwardly, in opposition to the spring 21, to its operative position engaging the film speed indicating means 12, as indicated in FIG. 1.

It will thus be noted that with this embodiment a single unitary member forms both the feeler means for sensing the location of the film speed indicating means 12 and the adjusting means for adjusting the structure of the camera which introduces into the latter the factor of the speed of the film exposed therein.

Figure 3:
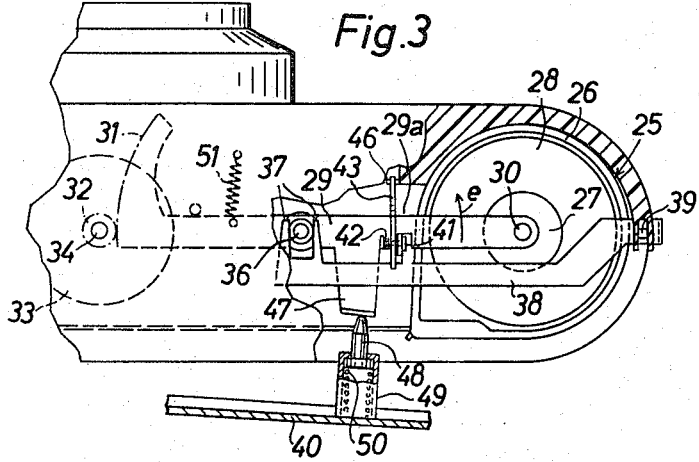
FIG. 3 is a fragmentary partly sectional top plan view of another embodiment of a camera and film-container structure according to the present invention.

With the embodiment shown in FIGS. 3-5, the film cartridge 25 is provided at one end with a depressed end wall 27 surrounded by a projecting rim, the rim 26 being visible in FIG. 3, so that in this way the depressed end wall 27 together with the projecting rim 26 form an end recess of the film cartridge 25. In this embodiment the film-speed indicating means takes the form of a ring 28 which is received in the recess 27 and which is fixed in the latter as by being glued to the end wall 27. The outer diameter of the ring 28 is substantially equal to the inner diameter of the rim 26, and also the thickness of the ring 28 does not exceed the width of the rim 26, so that the film speed indicating ring 28 is situated within the end recess of the film cartridge 25 in such a manner that no part of the film speed indicating means 28 projects beyond the rim 26, and thus the film speed indicating means is very well protected with this embodiment, whereas with the embodiment of FIG. 1 the projecting edge portion 13 may be subjected to unintentional damage upon impact against foreign objects or other cartridges or the like. The inner diameter of the ring 28 is indicative of the film speed, so that while the cartridge structures 25 will be identical, irrespective of the film speed, the cartridges will have fixed thereto different rings 28, according to the film speed, and the only difference between the several different rings 28 is that their inner diameters are different so as to indicate in this way the different film speeds. A particular advantage of this embodiment is that after the cartridges 25 have been completed and loaded with film, it is a simple matter to apply the film-speed indicating rings 28 thereto in an automatic manner with a suitable machine.

In order to adjust the camera in accordance with the speed of the film in the cartridge 25, the embodiment of FIGS. 3-5 includes a lever 29 which has a free right end, as viewed in FIG. 3, carrying a feeler pin 30, while the opposite end of the lever 29 is provided with a gear sector portion 31 meshing with a pinion 32 fixed coaxially to the galvanometer 33 which is supported for rotary movement by the pin 34, so that in response to turning of the lever 29 the angular position of the galvanometer will be adjusted in accordance with the film speed.

As is shown most clearly in FIG. 4, the lever 29 is supported for turning movement by a sleeve 35 which is mounted on a pin 36 which is fixedly carried by a stationary part of the camera, and this sleeve 35 is capable of turning on the pin 36 as well as shifting axially therealong. In order to move the sleeve 35 together with the lever 29 along the pin 36, so as to introduce the feeler means 30 into the end recess of the cartridge and out of the latter, more specifically into the space surrounded by the inner edge of the ring 28, the sleeve 35 is formed with an annular groove. A fork portion 37 (FIG. 3) of an elongated arm 38 extends into this groove of the sleeve 35, and the arm 38 forms part of a manually shiftable lock member 39 capable of locking the rear camera door 40 (FIG. 3) in a closed position locking the camera. As is particularly apparent from FIG. 5, the arm 38 has an integral lug 41 extending angularly therefrom and fixedly carrying a pin 42 on which a holding pawl 43 is supported for turning movement. This holding pawl 43 has a pawl tooth 44 which, in order to retain the lever 29 in its initial rest position, engages the edge 29a of the lever 29. The front of the pawl 43 is located over a pin 46 so that when the arm 38 is moved downwardly, in the direction of the arrow d, the front end of the pawl 43 will engage the stationary pin 46, carried by any suitable stationary part of the camera, to turn the pawl 43 in the direction of the arrow c (FIG. 5), so that in this way the tooth 44 of the pawl 43 will be displaced away from the edge 29a of the lever 29. A spring 45 is coiled about the pin 42 and engages the pawl 43 to urge the latter downwardly in the direction opposite that indicated by the arrow c.

The lever 29 is provided with a rearwardly directed extension 47 having an upwardly directed free end portion located in the path of movement of a spring-pressed plunger 48 carried by the door 40 at the rear of the camera. This plunger 48 has a head end guided in a sleeve 49 fixedly carried by the closure member 40 of the camera, and a spring 50 in the sleeve 49 urges the plunger 48 outwardly of the housing 49. Thus, when the closure member 40 is moved to its position closing the camera the projection 48 will engage the part 47 of the lever 29 to urge the latter to turn in the direction of the arrow e about the pin 36. The spring 50 is stronger than the spring 51 which is connected to the lever 29 for urging the latter to turn to the position illustrated in FIG. 3 where the front edge of the lever 29 engages a suitable stationary stop member which in this way determines the rest or initial position of the lever 29.

With this construction, after a new film cartridge 25 is introduced into the cartridge chamber, the rear cover 40 of the camera is displaced to its closed position closing the camera housing, so that the plunger 48 engages the projection 47 of the lever 29. Inasmuch as this lever 29 is held at this time in its initial position by the tooth 44 of the pawl 43, the result is only that the spring 50 is compressed while the closure 40 is displaced to its position closing the camera. When the closure 40 is in its position fully closing the camera, the operator will manipulate the slidable lock member 39 by engaging a handle portion 52 thereof (FIG. 4) and displacing this handle portion downwardly in the direction of the arrow d. In this way the rear door or closure 40 of the camera will be releasably locked in a well known manner. On the other hand, however, the arm 38 will be moved downwardly simultaneously with the locking of the closure 40, so that the fork 37 will shift the sleeve 35 downwardly, and thus the lever 29 itself will be moved downwardly, so that the feeler pin 30 will now become situated in the space which is surrounded by the ring 28. The upward movement of the arm 38 in order to open the camera had previously displaced the lever 29 to an elevation which situated the pin 30 out of the end recess of the film cartridge which was previously in the camera, so that now the locking of the rear door 40 of the camera in its closed position has lowered the lever 29 and the feeler means 30 thereof to the position where the pin 30 is surrounded by the ring 28, as indicated in the dotted line portion of FIG. 4. The downward movement of the arm 38 also places the pawl 43 against the stationary pin 46 which turns the pawl 43 in the direction of the arrow c, so that after the pin 30 has become situated in the space surrounded by the ring 28 the pawl 43 is turned by the pin 46 so as to release the lever 29 to the force of the spring 50 which is stronger than the return spring 51, as pointed out above, with the result that the lever 29 will now be turned in the direction of the arrow e (FIG. 3) about the pin 36 until the feeler pin 30 engages the inner periphery of the film-speed indicating ring 28, and in this way the extent of turning of the gear sector 31 is also determined. Of course, the extent to which the gear sector 31 turns from the initial position shown in dot-dash lines in FIG. 3 determines the angle through which the galvanometer housing 33 is turned, so that in this way the factor of the film speed is introduced into the camera.

In order to remove the cartridge 25 the operator will first move the arm 38 upwardly, in a direction opposite to that indicated by the arrow d, and in this way the rear wall 40 of the camera is unlocked and of course at the same time the lever 29 has been raised together with the arm 38 so that the pin 30 is now at an elevation higher than the cartridge. Thus, the film cartridge 25 is released and can be removed without any difficulty from the camera. The opening of the rear cover 40 of the camera has enabled the spring 51 to return the lever 29 to the initial position thereof indicated in FIG. 3. As a result the front edge 29a of the lever 29 is again received behind the pawl tooth 44, so that now all of the above-described operations in connection with the introduction of a film cartridge 25 can be repeated.

FIGS. 6 and 7 show a further embodiment of a film cartridge 55 according to the present invention. In this embodiment also the cartridge 55 has a depressed end wall 57 surrounded by a projecting rim 56 which defines with the end wall 57 an end recess of the cartridge 55. This end depression or recess of the cartridge receives in its interior a cam 58 which again has a thickness which is not greater than the extent to which the rim 56 projects beyond the end wall 57, so that the cam 58 does not project outwardly beyond the rim 56, as is particularly apparent from FIG. 7. This cam 58 is supported for rotary movement in the end recess of the cartridge, and for this purpose the cartridge of FIGS. 6 and 7, which may be made of metal, has at its end wall 57 a hollow projection 59 which extends freely through an opening of the cam 58 so that the latter is free to turn about the hollow projection 59, and in this way it is possible to give to the projection 58 any angular position which will correctly indicate the speed of the film which is in the cartridge 55. Once the operator has given to the cam 58 an angular position corresponding to the speed of the film in the cartridge 55, the outer extremity of the hollow projection 59 of the wall 57 is upset against the cam 58 so as to fixedly retain the latter in its adjusted position. Thus, with this embodiment also there is the possibility of adjusting the film-speed indicating means after the cartridge has been loaded. The structure of FIGS. 6 and 7 is also capable of cooperating with a feeler means, such as that of FIGS. 3-5, so that in this way the camera can be automatically adjusted to take into account the factor of the film speed with the construction of FIGS. 6 and 7.

It is to be noted in connection with the embodiment of FIGS. 3-5 that the operator need not be aware of the operations which are taking place in connection with the feeler means 30. In other words the controls are brought about by connecting the structure to parts of the camera which are manipulated in any event in connection with the removal and replacement of a film cartridge. In the illustrated example the structure for locking the rear camera door 40 has been chosen. The operator will manipulate the handle 52 in precisely the same way as is customary with such a locking structure, so that the control of the feeler means 30 to displace it into and out of the end recess of the cartridge 25 follows automatically from those operations which the operator performs in any event in connection with opening and closing of the camera, so that in this way the operator is not even conscious of the fact that the feeler means 30 is being displaced into and out of the end recess of the cartridge 25.

It will be understood that each of the elements described above, or two or more together, may also find a useful application in other types of cameras differing from the types described above.

While the invention has been illustrated and described as embodied in film-speed indicating structures for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in a camera which has a structure for adjusting the camera according to the speed of the film which is exposed therein, in combination, a film cartridge having a depressed end wall and a rim surrounding and projecting beyond said depressed end wall to define therewith an end recess of said cartridge; and an elongated bar member extending substantially parallel to said end wall in said recess and fixed to said cartridge at a position which is indicative of the speed of the film, so that by fixing said bar member to said cartridge when the speed of the film therein has been determined, the cartridge itself can have the same construction irrespective of the speed of the film to be placed therein, said bar member having a rounded end and said rim of said cartridge having a bearing portion receiving said rounded end of said bar member so that the latter can be turned in said bearing portion to a position indicative of the film speed, whereupon said bar member can be fixed in said latter position to the cartridge.

2. For use with a camera which has a structure for adjusting the camera according to the speed of the film which is exposed therein, in combination, a film cartridge having a depressed end wall and a rim surrounding and projecting beyond said depressed end wall to define with the latter an end recess of said cartridge, said end wall being made of metal; a cam situated in said recess and being formed with an opening passing therethrough; and means carried by said end wall in said recess for adjustably fixing said cam in said recess at a position therein which is indicative of the speed of the film in the cartridge, including a portion of said end wall which is hollow and which extends through said opening of said cam to support the latter for turning movement in said recess, so that after the angular position of said cam in said recess has been determined according to the speed of the film which has been introduced into the cartridge, an end portion of said hollow portion of said end wall which extends through said cam can be upset against said cam for fixing the latter in said recess.

3. In a camera, in combination, means for adjusting the camera according to the speed of the film which is exposed therein; a film cartridge having a depressed end wall and a rim extending beyond said depressed end wall and defining therewith an end recess of said cartridge; film speed indicating means fixedly carried by said cartridge in said end recess thereof; and feeler means for feeling said film speed indicating means and for actuating said adjusting means for adjusting the camera according to the speed of the film exposed therein, said feeler means having a rest position situated outside of said end recess and an operative position extending into said recess.

4. In a camera as recited in claim 3, movable means moved by the operator in connection with the removal of a cartridge from the camera, said movable means being operatively connected to said feeler means for moving the latter in the general direction of the axis of the film cartridge.

5. In a camera as recited in claim 4, a pin supporting said feeler means for longitudinal and turning movement so that said feeler means is in the form of a lever, said movable means being a manually operable lock for locking a closure member of the camera and said movable means being operatively connected to said lever for shifting the latter along said pin, said pin extending in the same general direction as the axis of said film cartridge.

6. In a camera as recited in claim 5, said movable means displacing said feeler means from its rest to its operative position when the closure means of the camera is moved to a position closing the camera and is then locked in its closed position.

7. In a camera, in combination, adjusting means for adjusting the camera according to the speed of the film exposed therein; a film cartridge having a depressed end wall and a rim projecting beyond said depressed end wall and defining with the latter an end recess of the film cartridge; film speed indicating means fixed to said cartridge in said end recess thereof; a feeler lever turnable between a rest position and an operative position and operatively connected to said adjusting means for actuating the latter to adjust the camera according to the speed of the film, said feeler lever engaging said film speed indicating means when the cartridge is introduced into the camera; spring means urging said lever to said rest position; and a closure member closing the camera and having a projecting portion engaging said lever and displacing the latter in opposition to said spring means into engagement with said film speed indicating means when said closure member is actuated to close the camera preparatory to making exposures.

References Cited

UNITED STATES PATENTS

| | | | |
|---|---|---|---|
| 3,111,072 | 11/1963 | Jakob et al. | 95—31 |
| 3,159,357 | 12/1964 | Berlings | 95—31 X |
| 3,266,398 | 8/1966 | Kremp et al. | 95—31 |
| 3,276,340 | 10/1966 | Nerwin | 95—10 X |

FOREIGN PATENTS

| | | |
|---|---|---|
| 456,782 | 8/1944 | Belgium. |
| 1,296,960 | 5/1962 | France. |
| 864,803 | 1/1953 | Germany. |

NORTON ANSHER, *Primary Examiner.*

JOHN M. HORAN, *Examiner.*

J. F. PETERS, *Assistant Examiner.*